| United States Patent [19] | [11] Patent Number: 4,839,234 |
|---|---|
| Kakugo et al. | [45] Date of Patent: Jun. 13, 1989 |

[54] POLYPROPYLENE FILM

[75] Inventors: Masahiro Kakugo, Narashino; Seiichiro Ima, Ichihara, both of Japan

[73] Assignee: Sumitomo Chemical Company, Limited, Osaka, Japan

[21] Appl. No.: 45,433

[22] Filed: May 4, 1987

[30] Foreign Application Priority Data

May 13, 1986 [JP] Japan ............................ 61-110231
Jun. 11, 1986 [JP] Japan ............................ 61-135593

[51] Int. Cl.$^4$ .............................................. B32B 27/00
[52] U.S. Cl. .................................... 428/349; 524/232; 428/461; 428/483; 428/476.3; 428/500; 428/511; 428/516
[58] Field of Search ................ 524/232; 428/349, 500, 428/511, 516, 483, 461, 476.3

[56] References Cited

U.S. PATENT DOCUMENTS

| 3,176,021 | 3/1965 | Volungis et al. | 524/232 |
| 3,562,291 | 2/1971 | Lutzmann et al. | 524/232 |
| 3,763,059 | 10/1973 | Needham et al. | 524/232 |
| 4,345,046 | 8/1982 | Ejk et al. | 524/223 |

*Primary Examiner*—Edith Buffalow
*Attorney, Agent, or Firm*—Stevens, Davis, Miller & Mosher

[57] ABSTRACT

A monolayer polypropylene film obtained by melt extrusion from a composition comprising 100 parts by weight of a crystalline polypropylene and, incorporated therein, a slipping agent [A] having a melting point of 100° to 125° C. and a slipping agent [B] having a melting point of 70° to 90° C. in a total amount of 0.05 to 1.0 part by weight, the initial coefficient of friction of said film being 0.7 or below and the coefficient of friction after heating at 60° C. being 1.0 or below; and a multilayer film composed of said polypropylene film layer having said composition and said characteristics and a substrate material layer.

5 Claims, No Drawings

POLYPROPYLENE FILM

FIELD OF THE INVENTION

This invention relates to polypropylene film and its multilayer film retaining excellent slipping characteristics at elevated temperatures or after heat treatment at elevated temperatures.

RELATED ART

Being excellent in optical and mechanical properties and in packaging characteristics, polypropylene film is widely used in packaging of foods, fibers, and the like. However, conventional polypropylene film has a disadvantage in that when stored or treated at a temperature of 45° C. or above, polypropylene film is deteriorated in slipperiness, one of the important characteristics of polypropylene film, thus becoming liable to cause troubles in secondary processing steps such as printing, laminating, and the like and in packaging applications.

OBJECTS AND SUMMARY OF THE INVENTION

An object of this invention is to provide a film which is hardly susceptible to deterioration in slip characteristics during storage at elevated temperatures or heat treatment at elevated temperatures, said deterioration being liable to occur in conventional polypropylene film and causing troubles in secondary processing steps or in packaging applications.

One of the features of this invention is a polypropylene film obtained by the melt extrusion from a composition comprising 100 parts by weight of a crystalline polypropylene and, incorporated therein, a slipping agent [A] having a melting point of 100° to 125° C. and a slipping agent [B] having a melting point of 70° to 90° C. in a total amount of 0.05 to 1.0 part by weight, an initial coefficient of friction of said film being 0.7 or below and a coefficient of friction after heating at 60° C. being 1.0 or below. Another feature of this invention is a multilayer film composed of a polypropylene film layer and a substrate film layer, which is characterized in that at least one of said film layers has a composition comprising 100 parts by weight of a crystalline polypropylene and, incorporated therein, a slipping agent [A] having a melting point of 10° to 125° C. and a slipping agent [B] having a melting point of 70° to 90° C. in a total amount of 0.05 to 1.0 part by weight, said polypropylene film constituting said polypropylene film layer having an initial coefficient of friction being 0.7 or below, the temperature at which said coefficient of friction becomes 0.7 being 45° C. or above.

DETAILED DESCRIPTION OF PREFERRED EMBODIMENTS

The crystalline polypropylene for use in this invention is any of the polypropylenes which can be used in either unstretched or stretched film and is not subject to any particular restriction. However, from the viewpoint of packaging performance, it is desirable to use a crystalline propylene-α-olefin copolymer having a melting point in the range of 100° to 150° C., an ethylene content of 0 to 10% by weight, a butene-1 content of 0 to 35% by weight and a propylene content of 65 to 98% by weight. If a crystalline propylene-α-olefin copolymer having a melting point below 100° C. is used, the film is insufficient in stiffness, whereas if an copolymer having a melting point exceeding 150° C. is used, the film is insufficient in heat-seal property; both cases are liable to cause troubles in packaging operation. It is most preferable to use a crystalline propylene α-olefin copolymer having a melt flow index of 1 to 50 g per 10 minutes, a melting point of 110° to 145° C., an ethylene content of 1.0 to 7.0% by weight, a butene-1 content of 2.0 to 30% by weight and a propylene content of 70 to 98% by weight.

The crystalline polypropylenes described above can contain 0.1 to 10% by weight of polyethylene or other resins.

The slipping agents used in this invention are combination systems of a slipping agent [A] having a melting point of 100° to 125° C. and a slipping agent [B] having a melting point of 70° to 90° C. Such a combination system exhibits good performance with smaller amounts of slipping agents compared with each slipping agent used alone.

The slipping agents [A] are those which have a melting point in the range of 100° to 125° C. and are exemplified by $C_{16}$–$C_{22}$ saturated fatty acid amides, derivatives thereof, and $C_{18}$–$C_{22}$ unsaturated fatty acid amides derivatives. More particular examples are those containing as principal constituent stearic acid amide, palmitic acid amide, behenic acid amide, N-(2-hydroxy-methy)-stearamide, hexamethylenebisoleic acid amide, hexamethylenebiserucic acid amide, and octamethylenebiserucic acid amide. Other amides meeting the requirements of this invention can also be used freely. A slipping agent [A] having a melting point below 100° C. often exhibits a good initial slip but is undesirable because of marked deterioration in slip characteristics at temperatures higher than 45° C. A slipping agent [A] having a melting point exceeding 125° C. is also undesirable because of failure in exhibiting initial slip. A particularly preferred slipping agent [A] is a saturated fatty acid amide having a melting point of 107° to 120° C. in view of keeping the rolls clean during film formation.

The slipping agents [B] are those having a melting point ranging from 70° to 90° C. and exemplified by $C_{18}$–$C_{22}$ unsaturated fatty acid amides, derivatives thereof, $C_{10}$–$C_{12}$ saturated fatty acid amides, and derivatives thereof. Particular examples are those containing as principal constituent oleic acid amide, erucic acid amide, brassidic acid amide, elaidic acid amide, N-stearylerucamide, lauric acid amide, and N-(2-hydroxyethyl)lauramide. The slipping agent [B] is not limited to the above-listed amides but can be any of those meeting the requirements of this invention. A slipping agent [B] having a melting point below 70° C. is undesirable because of marked decline of said coefficient at temperatures exceeding 45° C. Slipping agents [B] having a melting point exceeding 90° C. are undesirable because of the unsatisfactory effect of the joint use with slipping agent [A].

The amount of slipping agents [A] and [B] to be added and the ratio between then are as described below.

The suitable amounts of slipping agents [A] and [B] are 0.05 to 1.0, preferably 0.07 to 0.25, parts by weight in total. The addition in a total amount below 0.05 part by weight is undesirable because of insufficiency in initial slip or in slip after heating, whereas the addition of large amount exceeding the necessary amount is undesirable, because the bleed-out of slipping agents on the film surface may injure the characteristics inherent in polypropylene film and because the excessive addition is uneconomical. The ratio of slipping agent [A] to [B] is in the range 0.2 to 20. It is desirable to adjust the ratio so that the combination of slipping agents may have a melting point in the range of 95° to 115° C. A ratio below 0.2 is undesirable because of the insufficient slip after heating, whereas a ratio exceeding 20 is also undesirable because of insufficient initial slip.

When used as a monolayer polypropylene film or in a multilayer film, the polypropylene film of this invention exhibits such characteristics as described below.

In the case of monolayer polypropylene film, it is necessary that the initial coefficient of friction (which is achieved, for example, by subjecting a film of this invention to aging for 1 to 3 days under the temperature conditions of 30° to 35° C.) be 0.7 or below and the coefficient of friction after heating at 60° C. be 1.0 or below. An initial coefficient of friction exceeding 0.7 is undesirable because of insufficient slip in the steps of secondary processing such as printing or lamination operation. A coefficient of friction exceeding 1.0 after heating at 60° C. is also undesirable, because insufficient slip is developed in storage at elevated temperatures in summer or in aging after lamination.

The multilayer film of this invention is characterized by having, at least on one side, a monolayer polypropylene film with an initial coefficient of friction being 0.7 or below the coefficient of friction becoming 0.7 by heating at 45° C. or above. If the coefficient of friction becomes 0.7 at a temperature below 45° C., the film shows unsatisfactory slip during storage at elevated temperatures in summers and, in addition, the aging after dry lamination, for example, must be carried out at a temperature in cold range lower than 40° C, resulting in extended period of aging which is unfavorable from economic viewpoint. The multilayer film of this invention can be produced by known methods such as dry lamination and extrusion lamination.

As described above, the polypropylene film is advantageous in the slip properties both in early stage and at elevated temperatures. As a consequence, the film of this invention retains remarkably stabilized slip after having been exposed to high temperatures in summar of in aging at temperatures higher than 45° C. subsequent to the dry lamination, as contrasted with conventional films which are liable to suffer from marked deterioration in slip properties under such temperature conditions. Thus, the film of this invention is not susceptible to troubles due to declined slip properties in steps of secondary processing and packaging, indicating the economic advantage of this invention.

Regarding the slip properties of the above polypropylene film, it is preferable that the initial coefficient of friction be 0.6 or below and the coefficient of friction after heating at 60° C. be 0.8 or below for the monolayer polypropylene film and the initial coefficient of friction be 0.6 or below and the temperature at which the coefficient of friction becomes 0.6 be 45° C. or above for the multilayer film.

The polypropylene film of this invention is in the form of monolayer polypropylene film formed by conventional methods such as T-die and inflation methods as well as in the form of multilayer film produced by laminating either an unstretched or stretched film with other films by means of conventional methods such as dry lamination and extrusion lamination, said other films including biaxially stretched polypropylene film, unsaturated nylon film, stretched nylon film, stretched poly(ethyl terephthalate) film, aluminum foil and paper.

The thickness of film layer formed is not subject to any particular restriction, but it is preferably 5 to 150μ, most preferably 15 to 40μ. μ.

The polypropylene film of this invention may contain, if necessary, known additives such as antioxidants, UV absorbers, antistatics, antifrosting agents, antiblocking agents, nucleating agents, etc. It is also possible to subject the polypropylene film of this invention to surface treatment such as corona discharge treatment of flame treatment in a way customary for the industry.

EXAMPLES

In order to illustrate more clearly, Examples and Comparative Examples are given hereunder, but the invention is not limited to the Examples. In Examples and Comparative Examples the characteristic values were obtained according to the following methods.

1. Melt flow index

Melt flow index was determined according to JIS K 6758.

2. Melting point

Melting point was determined on a sample (5–10 mg) sealed in a solid sample holder under a nitrogen atmosphere by means of a differential scanning calorimeter (DSC of Perkin-Elmer Co.) at a heating rate of 5° C./minute. From the fusion diagram the peak temperature indicating the maximum heat absorption was taken as melting point.

When the sample was mixture of slipping agents or was a crystalline polypropylene, it was subjected to the following pretreatment before melting point determination.

Procedure for Pretreatment

Mixture of slipping agents: A blend of slipping agents were thoroughly mixed by grinding in a mortar, placed in a solid sample holder, heated at 150° C. for 30 seconds, and left standing at room temperature for 12 hours.

Crystalline polypropylene: The sample was sealed in a solid sample holder, fused at 220° C. for 5 seconds under a nitrogen atmosphere in DSC, and cooled down to 40° C. at a cooling rate of 5° C./minute.

3. Ethylene Content and Butene-1 Content

Ethylene content was determined by the IR spectrum method as described under the heading "(i) random polymer" in page 256 of "Handbook for Polymer Analysis" (published by Asakura Shoten Co., 1985).

Butene-1 content was determined by IR spectrum method and the equation:

Butene-1 content (% by wt.)=1.208 $K'_{767}$

4. Haze

ASTM D2457

5. Coefficient of Friction

Using a friction angle tester (Toyo Seiki Co.) angle of sliding ($\theta$) was measured between two pieces of the film sample under a load of 6.3 cmL×10.0 cmW×1.9 cmH in size and 1 kg in weight. The coefficient of friction was expressed in tan $\theta$. A smaller value indicates better slip properties.

EXAMPLE 1

A crystalline polypropylene used was a crystalline propylene-ethylene-butene-1 terpolymer having an ethylene content of 2.1% by weight, a butene-1 content of 6.0% by weight, a propylene content of 91.9% by weight, a melt flow index of 5.2 g/10 min., and a melting point of 138° C. To 100 parts by weight of the terpolymer, were added 0.09 part by weight of BNT-22H (melting point 113° C., Nippon Seika Co.) and 0.03 part by weight of Neutron ®-S (melting point 85° C., Nippon Seika Co.), both used as slipping agent, followed by 0.05 part by weight of calcium stearate, 0.1 part by weight of Sumilizer ®BHT (Sumitomo Chemical Co.), and 0.2 part by weight of Syloid ®244 (Fuji-Davison Co.). The mixture was thoroughly mixed and melt extruded from an extruder heated at 210° C. The extruded strand was pelletized by cutting. The said mixture of BNT-22H (melting point 113° C.), and Neutron ®-S (melting point 85° C.) in the said ratio (9:3) showed a melting point of 108° C.

Formation of Unstretched Film and Physical Properties thereof

The above pellets were melt extruded through a 40-mm φT-die extruder at a resin temperature of 230° C. and solidified by cooling on a cooling roll at 25° C. to obtain unstretched polypropylene film of 30μ in thickness. During the film formation the surface of cooling roll was inspected but substantially no adhered matter was detected.

The resulting film was pretreated in an air-circulating constant temperature bath at 35° C. for 3 days. The pretreated film showed a haze of 3.1% and a coefficient of friction of 0.35. The film was then heat-treated for 24 hours in an air-circulating constant temperature bath heated at 60° C. After having been left standing at room temperature for one hour, the heat-treated film was found to show a coefficient of friction of 0.30.

Formation of Multilayer Film and Physical Properties thereof

The unstretched film, which had been preheated at 35° C. for 3 days as described above, and a biaxially stretched polypropylene film (OPP) of 25μ in thickness were dry-laminated by applying 3 g/m² (solids basis) of Takelac ®A-967 (a polyurethane-base adhesive of Takeda Chemical Industries Co.) to obtain a multilayer film. The resulting multilayer film was heat-treated at 45° C. for 24 hours and tested for the coefficient of friction of the surface of unstretched polypropylene film side. The coefficient of friction was found to be 0.28, indicating the suitability of multilayer film for secondary processing and for packaging.

EXAMPLE 2 AND COMPARATIVE EXAMPLE 1

An unstretched film and a multilayer film were prepared in the same manner as in Example 1, except that the incorporated amount of the slipping agent [A] or [B] was varied. The performance characteristics of the resulting film were as shown in Table 1.

EXAMPLES 3, 4, 5 AND COMPARATIVE EXAMPLES 2 AND 3

Unstretched film and multilayer films were prepared in the same manners as in Example 1, except that the kind or the incorporated amount of the slipping agent [A] or [B] was varied. The performance characteristics of the resulting films were as shown in Table 1.

COMPARATIVE EXAMPLES 4 AND 5

Unstretched film and multilayer films were prepared in the same manners as in Example 1, except that 0.1 part by weight of a slipping agent Denon ®SL-1 (melting point 79° C., Marubishi Yuka Co.) or Neutron ®-S (melting point 85° C., Nippon Seika Co.) was used each alone. The performance characteristics of the resulting films were as shown in Table 1.

EXAMPLES 6 TO 9 AND COMPARATIVE EXAMPLES 6 AND 7

Unstretched films and multilayer films were prepared in the same manner as in Example 1, except that 100 parts by weight of a crystalline propylene-ethylene-butene-1 terpolymer was incorporated with 1.5 parts by weight of a linear low-density polyethylene having a melt flow index of 12 g/10 min. and a density of 0.904 g/cm³; that BNT-22H (melting point 113° C., Nippon Seika Co.) and Neutron ®-S (melting point 85° C., Nippon Seiko Co.) were used as slipping agents [A] and [B], respectively; and that the thickness of unstretched film was 20μ. The performance characteristics of the resulting films were as shown in Table 2.

EXAMPLES 10 to 12

Unstretched films were prepared in the same manner as in Example 1, except that the crystalline polypropylene used was a crystalline propylene-ethylene copolymer having an ethylene content of 6.0% by weight, a propylene content of 94.0% by weight, a melt flow index of 12.5 g/10 min., and a melting point of 134° C. or a crystalline propylene-butene-1 copolymer having a butene-1 content of 19.1% by weight, a propylene content of 80.9% by weight, a melt flow index of 3.5 g/10 min., and a melting point of 139° C., or a crystalline propylene butene-1 copolymer having a butene-1 content of 26.2% by weight, a propylene content of 73.8% by weight, a melt flow index of 4.1 g/10 min., and a melting point of 117° C.; and that to 100 parts by weight of each crystalline polypropylene, were added 0.09 part by weight of a slipping agent BNT-22H (melting point 113° C., Nippon Seika Co.) and 0.03 part by weight of a slipping agent Neutron ®-S (melting point 85° C., Nippon Seika Co.), said slipping agents being used as slipping agents [A] and [B], respectively. The performance characteristics of the unstretched films were as shown in Table 3.

EXAMPLE 13

The pellets were prepared in the same manner as in Example 1, except that 0.09 parts by weight of BNT-22H (melting point 113° C., Nippon Seika Co.) and 0.03 parts by weight of Neutron ®-S melting point 85° C., Nippon Seika Co.) were used as slipping agents (A) and (B), respectively.

Formation of Stretched Film and Physical Properties thereof

The above pellets were melt extruded through a 40 mmφ sheet extruder at a resin temperature of 230° C. and solidified by cooling at 25° C. to obtain a piece of sheet having a thickness of 500μ. During the formation of the sheet the surface of cooling roll was inspected but substantially no adhered matter was detected.

Thereafter, thus obtained sheet was stretched biaxially at 5-fold each using a biaxial stretching apparatus to obtain a stretched film of about 20μ thickness.

The resulting stretched film was pretreated in an air-circulating constant temperature bath at 35° C. for one day. The pretreated film showed a haze of 2.8% and a coefficient of friction of 0.45. The film was then heat-treated for 24 hours in an air-circulating constant temperature bath heated at 60° C.

After having been left standing at room temperature for one hour, the heat-treated film was found to show a coefficient of friction of 0.25.

Further, said film was heat-treated for 10 minutes in an air-circulating constant temperature bath heated at 80° C. to determine a coefficient of friction at an elevated temperature (so-called "hot slipping characteristics"). Thereafter, the heat-treated film was left standing at room temperature for one minute or less to determine a coefficient of friction which was found to show 0.36.

This indicates the suitability of said biaxially stretched film for a use of shrink packaging.

The performance characteristics of the resulting film were as shown in Table 4.

EXAMPLE 14 AND COMPARATIVE EXAMPLES 8 AND 9

Stretched films were prepared in the same manner as in Example 1, except that the kind or the incorporated amount of the slipping agent [A] or [B] was varied. The performance characteristics of the resulting films were shown in Table 4.

EFFECT OF THE INVENTION

According to this invention, there are provided a monolayer polypropylene film and a multilayer film which retain good slip characteristics at elevated temperatures and are improved in fouling of roll and in suitability for secondary processing and for packaging.

TABLE 1

| | Slipping agent | | | | | | |
|---|---|---|---|---|---|---|---|
| | Slipping agent [A] | | | Slipping agent [B] | | | |
| Example and Comparative Example | Name | M.p. °C. | Amount, parts by weight | Name | M.p. °C. | Amount, parts by weight | M.p. of mixture °C. |
| Example-1 | BNT-22H | 113 | 0.09 | Neutron ®-S | 85 | 0.03 | 108 |
| Example-2 | " | " | 0.06 | " | " | 0.02 | " |
| Example-3 | " | " | 0.09 | Denon ®SL-1 | 79 | 0.03 | 110 |
| Example-4 | " | " | " | SNT-40 | " | " | 109 |
| Example-5 | Armide ®HT | 104 | " | Neutron ®-S | 85 | " | 99 |
| Comparative Example-1 | BNT-22H | 113 | 0.08 | — | — | — | — |
| Comparative Example-2 | " | " | 0.06 | Armide HT | 104 | 0.06 | 102 |
| Comparative Example-3 | Denon ®2545 | 146 | 0.09 | Neutron ®-S | 85 | 0.03 | 140 |
| Comparative Example-4 | — | — | — | " | " | 0.10 | — |
| Comparative Example-5 | — | — | — | Denon ®SL-1 | 79 | " | — |

| Example and Comparative Example | Fouling of roll | Pretreated film Haze % | Pretreated film Coefficient of friction tan θ | Coefficient of friction of film, heat-treated at 60° C., tan θ | Coefficient of friction of multilayer film, heat treated at 45° C., tan θ | Suitability for secondary processing and for packaging |
|---|---|---|---|---|---|---|
| Example-1 | Very little | 3.1 | 0.35 | 0.30 | 0.28 | Good |
| Example-2 | " | 3.1 | 0.56 | 0.47 | 0.54 | " |
| Example-3 | " | 3.0 | 0.44 | 0.42 | 0.47 | " |
| Example-4 | " | 2.8 | 0.61 | 0.40 | 0.44 | " |
| Example-5 | Slight | 2.8 | 0.37 | 0.60 | 0.61 | " |
| Comparative Example-1 | Very little | 3.1 | 0.75 | 0.58 | 0.77 | Poor |
| Comparative Example-2 | Slight | 3.2 | 1.02 | 0.85 | 0.75 | " |
| Comparative Example-3 | Very little | 3.1 | 1.1 | 0.93 | 0.86 | " |
| Comparative Example-4 | " | 3.0 | 0.36 | 1.5 | 1.3 | " |
| Comparative Example-5 | " | 2.9 | 0.51 | 1.4 | 1.5 | " |

Note:
BNT-22H Nippin Seika, behenic acid amide,
Armide ®-HT Lion Yushi, stearic acid amide,
Neutron ®-S Nippon Seika, erucic acid amide,
Denon ®SL-1 Marubishi Yuka, oleic acid amide,
SNT-40 Nippon Seika, N—stearylerucamide,
Denon ®2545 Marubishi Yuka, ethylenebisstearic acid amide

TABLE 2

| Example and Comparative Example | Slipping agent BNT-22H M.p. °C. | Slipping agent BNT-22H Amount, parts by wt. | Slipping agent Neutron ®-S M.p. °C. | Slipping agent Neutron ®-S Amount, parts by wt. | M.p. of mixture °C. | Pretreated film Haze % | Pretreated film Coefficient of friction tan θ | Coefficient of friction of film heat-treated at 60° C. tan θ | Coefficient of friction of multilayer film, heat-treated at 45° C. tan θ | Suitability for secondary processing and for packaging |
|---|---|---|---|---|---|---|---|---|---|---|
| Example-6 | 113 | 0.05 | 85 | 0.07 | 96 | 3.4 | 0.15 | 0.62 | 0.54 | Good |
| Example-7 | " | 0.05 | " | 0.05 | 100 | 3.4 | 0.32 | 0.48 | 0.47 | Good |
| Example-8 | " | 0.105 | " | 0.015 | 111 | 3.5 | 0.67 | 0.38 | 0.45 | " |
| Example-9 | " | 0.15 | " | 0.05 | 108 | 3.4 | 0.27 | 0.23 | 0.31 | " |
| Comparative Example-6 | " | 0.03 | " | 0.01 | 108 | 3.3 | 1.5 | 1.2 | 1.3 | Poor |
| Comparative Example-7 | " | 0.01 | " | 0.10 | 84 | 3.4 | 0.10 | 1.1 | 1.3 | " |

TABLE 3

| Example | Fouling of roll | Pretreated film Haze % | Pretreated film Coefficient of friction tan θ | Coefficient of friction of film heat-treated at 60° C. tan θ | Coefficient of friction of multilayer film, heat-treated at 45° C. tan θ | Suitability for secondary processing and for packaging |
|---|---|---|---|---|---|---|
| Example-10 | Very little | 2.5 | 0.34 | 0.31 | 0.41 | Good |
| Example-11 | " | 6.3 | 0.37 | 0.36 | 0.35 | " |
| Example-12 | " | 6.0 | 0.48 | 0.52 | 0.54 | " |

TABLE 4

| Example or Comparative Example | Slipping agent [A] Name | Slipping agent [A] M.p. °C. | Slipping agent [A] Amount, parts by weight | Slipping agent [B] Name | Slipping agent [B] M.p. °C. | Slipping agent [B] Amount, parts by weight | M.p. of mixture °C. |
|---|---|---|---|---|---|---|---|
| Example-13 | BNT-22H | 113 | 0.09 | Neutron ®-S | 85 | 0.03 | 108 |
| Example-14 | " | " | 0.09 | Denon ® SL-1 | 79 | 0.03 | 110 |
| Comparative Example-8 | — | — | — | " | 79 | 0.12 | — |
| Comparative Example-9 | Denon ® 2545 | 146 | 0.09 | Neutron ®-S | 85 | 0.03 | 140 |

| Example or Comparative Example | Smoking or fouling or roll | Pretreated film Haze % | Pretreated film Coefficient of friction* μk | Coefficient of friction* of film heated at 60° C., μk | Coefficient of friction* of film 80° C., μk | Suitability as a whole |
|---|---|---|---|---|---|---|
| Example-13 | Hardly observed | 2.7 | 0.47 | 0.27 | 0.43 | Good |
| Example-14 | Hardly observed | 2.5 | 0.52 | 0.31 | 0.83 | " |
| Comparative Example-8 | Hardly observed | 3.0 | 0.41 | 0.80 | 1.32 | Poor |
| Comparative Example-9 | Hardly observed | 2.7 | 0.86 | 0.68 | 1.05 | " |

Note:
*Determined according to ASTM D 1894-63; a smaller figure shows favorable slipping characteristics.

What is claimed is:

1. A multilayer film composed of a polypropylene film layer and a substrate film layer, which is characterized in that at least one of said film layers has a composition comprising 100 parts by weight of a crystalline polypropylene and, incorporated therein, a slipping agent [A] having a melting point of 100° C. to 125° C. and a slipping agent [B] having a melting point of 70° to 90° C., where the ratio of the slipping agent [A] to [B] is in the range of from 0.2 to 20, in a total amount of 0.05 to 1.0 part by weight, said polypropylene film constituting said polypropylene film layer having a initial coefficient of friction being 0.7 or below, the temperature at which said coefficient of friction becomes 0.7 being 45° C. or above.

2. A multilayer film according to claim 1, wherein said polypropylene film is an unstretched one.

3. A multilayer film according to claim 1, wherein the crystalline polypropylene is a crystalline propylene-α-olefin copolymer having an ethylene content of 0 to 10% by weight, a butene-1 content of 0 to 30% weight, and a propylene content of 70 to 98% by weight.

4. A multilayer film according to claim 1, wherein the crystalline polypropylene is a crystalline propylene-α-olefin copolymer having a melt flow index of 1 to 50 g per 10 minutes, a melting point of 110° to 145° C., an ethylene content of 1.0 to 7.0% by weight, a butene-1 content of 2.0 to 30% by weight, and a propylene content of 70 to 98% by weight.

5. A multilayer film according to claim 1, wherein the slipping agent [A] is a saturated fatty acid amide having a melting point of 107° to 120° C. and the slipping agent [B] is an unsaturated fatty acid amide having a melting point of 80° to 90° C.

* * * * *